(No Model.)
N. G. WILLIAMS.
CENTRIFUGAL CREAMER.
No. 500,787. Patented July 4, 1893.
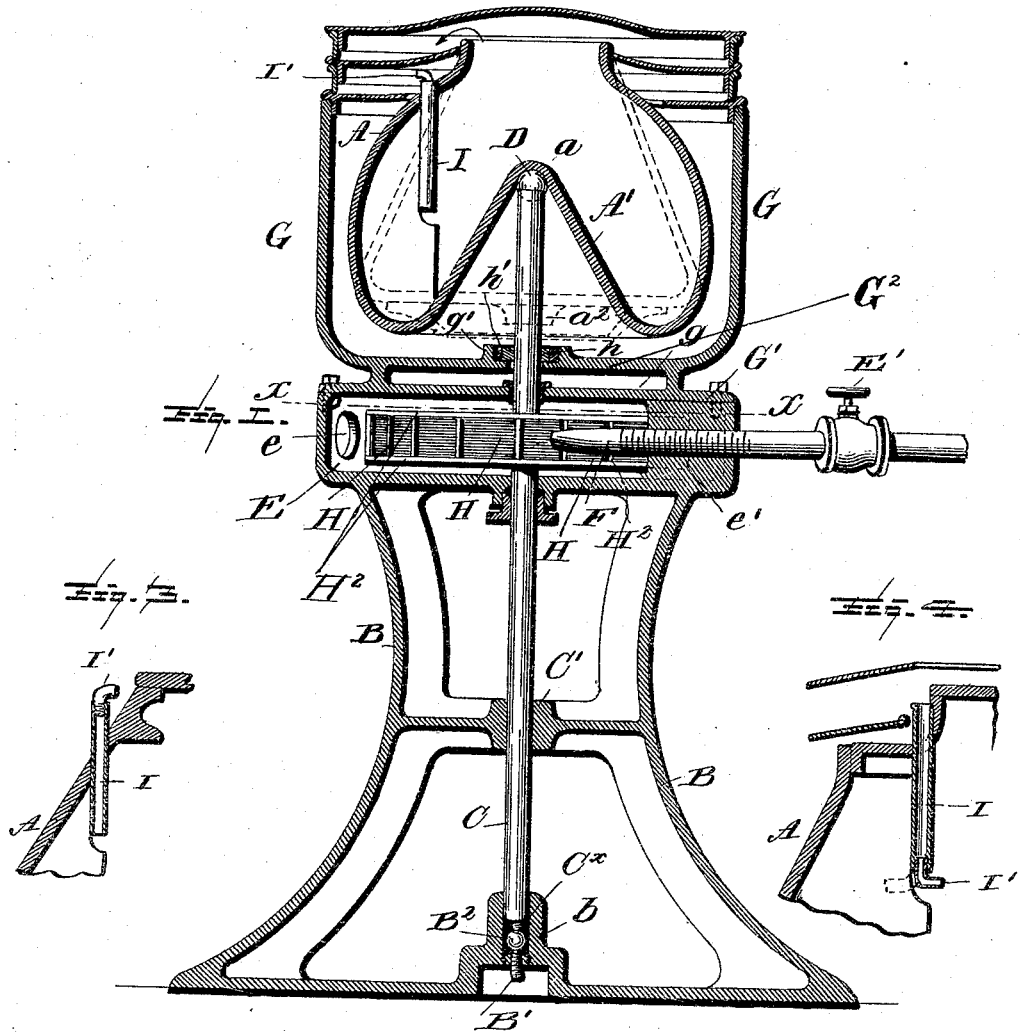
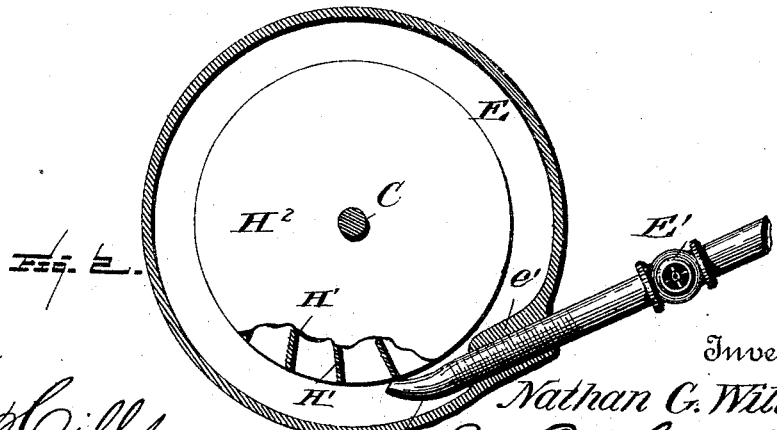
Witnesses
L. C. Hills.
E. H. Bond.
Inventor:
Nathan G. Williams
By E. B. Stocking
Attorney

UNITED STATES PATENT OFFICE.

NATHAN G. WILLIAMS, OF BELLOWS FALLS, VERMONT.

CENTRIFUGAL CREAMER.

SPECIFICATION forming part of Letters Patent No. 500,787, dated July 4, 1893.

Application filed May 12, 1892. Serial No. 432,750. (No model.)

*To all whom it may concern:*

Be it known that I, NATHAN G. WILLIAMS, a citizen of the United States, residing at Bellows Falls, in the county of Windham, State of Vermont, have invented certain new and useful Improvements in Centrifugal Creamers, of which the following is a specification, reference being had therein to the accompanying drawings.

This invention relates to certain new and useful improvements in centrifugal separators of that class in which the motive power is obtained by means other than belts.

Heretofore it has been proposed to apply to the bowl a steam wheel by which the bowl is driven and which also serves to temper the contents of the bowl. Experience has taught that such is a disadvantage for the reason that frequently the steam heats the contents of the bowl to such an extent as to be an injury to the separate liquids that are thrown off from the bowl. I therefore aim to obviate this objection and therefore provide a wheel or pulley with suitable blades or buckets on its rim to receive the jet of steam from the point of a steam tube. As I can make this pulley any desired diameter of course the larger the diameter the less power or force of steam is required to revolve it. I can thus regulate the size of the wheel according to the force or power of the motive force which operates it. To further avoid the heating of the contents of the bowl I arrange the wheel or pulley on the shaft at a distance from the bowl and provide an air space or chamber between the said wheel and bowl. Thus neither the bowl nor its contents are heated. The bowl may be mounted upon its spindle in any desirable manner; when a suspended bowl is employed the upper end of the spindle is constructed preferably with a socket for the retention of a ball which rests in a corresponding depression in the bottom of the bowl; a yielding packing is employed where the spindle passes through the partition or bottom of the bowl-casing which, together with the ball support for the bowl permits the bowl to at all times find its own balance. The spindle may be stepped so as to be readily adjustable vertically to vary the height.

Other objects and advantages of the invention will hereinafter appear, and the novel features thereof will be specifically defined by the appended claims.

The invention is clearly illustrated in the accompanying drawings, which, with the letters of reference marked thereon, form a part of this specification, and in which—

Figure 1 is a vertical central section through my improved centrifugal separator. Fig. 2 is a horizontal section on the line $x$ $x$ of Fig. 1. Figs. 3 and 4 are sectional details, showing the cream tube.

Like letters of reference indicate like parts in all the views where they occur.

As the manner of separating the liquid in this case is similar to that in other centrifugal machines, the milk and cream being taken out, one into one pan and the other into another, a detailed description of the said process is not here necessary. Further, as there is nothing novel claimed in the bowl, which may be of any of the well-known or approved forms, the same will not be described in detail. If a pendulous or balanced bowl is desired I employ preferably the form shown by full lines in Fig. 1, in which A designates the bowl which has a central raised portion A' forming a depression or socket $a$ upon the under side as shown for the reception of the ball upon the upper end of the spindle. This form of bowl is one in which the milk and cream are discharged at the top upon the pans, while in the form of bowl $A^2$, shown by dotted lines in said Fig. 1, the liquids are designed to be discharged from the bottom; this form may be mounted on the spindle in any of the methods known to mechanics; it is shown as provided with a boss $a^2$ through which the spindle passes or in which it is mounted in any suitable manner.

A suitable frame-work B is provided which may of course be designed to conform to the location or space in which it is to be arranged, and at its base is provided with a bored boss $b$ in which is adjustably mounted a steel point B' within a socket in which rests a steel ball $B^2$ upon which rests a steel point $C^\times$ on the lower end of the spindle, these points or steps being so constructed that they can be readily adjusted to compensate for wear or to adjust or vary the height when desired. The spindle C is thus stepped at its lower end and at any desired point above the said step it has a bearing in a brace C' or spider on the frame-work. The upper end of the spindle, when a suspended or balanced bowl is employed, is provided with a socket as seen by dotted lines in Fig. 1, upon which rests a ball D preferably of steel; this ball may be polished, or its surface roughened as necessary to make the friction required for the bowl of the separator, in the depression of which the said ball works, to revolve with the spindle. Resting the bowl loosely upon the ball allows it to find its own balance automatically.

The frame-work or support B is formed at its upper end with a chamber E for the steam wheel, which chamber has a steam outlet $e$ which should be many times larger than the steam jet. This steam jet F is adjustably supported in the wall of the chamber, which is preferably interiorly thickened as seen at $e'$ and its inner end is slightly curved as seen in Fig. 2 so as to best discharge the steam against the blades or buckets of the wheel. The steam jet tube is designed to be connected with any suitable source of steam and is provided with a suitable valve E' as shown by which the amount of steam may be regulated. The cap or top of this chamber is formed by the bottom portion G' of the bowl-casing G which is designed to be detachably secured in position in any suitable manner so as to form a steam tight joint; it also provides for ready access to the interior of the chamber to inspect or repair the wheel when necessary. Between this cap and the bottom $G^2$ of the bowl-casing is formed an air space or chamber $g$ which serves to prevent heating of the bowl or its contents.

Suitable packing or gaskets are provided where the spindle passes through the bottom of the bowl casing, the cap and the bottom of the wheel-chamber as shown; those in the bottom of the wheel-chamber and the cap being of any approved form to prevent escape of steam, while that in the bottom of the bowl-casing is seated in a chamber or socket $g'$ formed therein and consists of a rubber ring $h$ and a metal bushing $h'$ seated one within the other in the said socket and permiting slight play of the spindle at this point to aid in the balancing of the bowl.

H is the wheel or pulley fast to the spindle within the wheel-chamber E and is provided with the blades or buckets H' held between the flanges of heads $H^2$ of the wheel; the steam jet is so arranged as to direct the steam against the said blades as seen best in Fig. 2.

Any suitable packings or packing devices may be employed in the steam chamber and bowl-casing.

The air-chamber $g$ may be of any desired depth and of the requisite area.

It is evident that where water power is more accessible than steam it may be employed in the apparatus described without change of structure.

It is sometimes desirable to vary the thickness of the cream withdrawn from the bowl, and in order to do this readily and also to draw the cream out of the bowl I have provided a substantially vertical tube I which may be readily applied and attached to any separator bowl. It is arranged on the edge of one of the wings of the bowl as seen in Figs. 1, 3 and 4 and is so located that it comes just where the cream wall and milk wall meet in the said bowl, so that the cream can be taken out through this tube and the thickness or density of the cream is varied by means of a screw threaded nozzle I' in the end of the tube. As seen in Fig. 4 this nozzle or curved or right-angled portion I' is arranged at the lower end of the tube or pipe and is arranged with its receiving end turned inward toward the center of the bowl whereby it will receive the densest cream; now if this nozzle be turned so that this end will be brought a little farther from the center of the bowl it will take the cream from a less dense strata and so on, and as the end is brought nearer the outer wall of the bowl the less dense will be the cream delivered. The density of the cream delivered through this tube or pipe is regulated by the turning of the nozzle either to the right or left. This may be done in any suitable manner and is adjusted before the bowl commences to rotate. It will thus be seen that any per cent. of cream can be taken out of the bowl when in operation.

The nozzle, instead of being located at the lower end of the tube as shown in Fig. 4, may be arranged at the upper end as seen in Figs. 1 and 3. The operation is substantially the same.

What I claim as new is—

1. A frame-work for a centrifugal machine, comprising a bowl-casing, a steam-motor case and an interposed closed air-chamber, substantially as specified.

2. A frame-work for a centrifugal machine, comprising a bowl-casing, a steam-motor case and an interposed air-chamber, the bowl-casing and air-chamber being detachably connected with the motor-case, substantially as specified.

3. The combination with the spindle and the bowl, of a steam chamber beneath the bowl, a steam wheel fast on the spindle within the said chamber, a steam supply to said wheel, and an air-chamber between the bowl-casing and the steam-chamber, substantially as specified.

4. The combination with a support having motor-case, bowl-casing and interposed air-chamber, of a suitably-stepped spindle a bowl loosely supported thereon on a ball bearing, a motor-wheel in the motor-case, and means for supplying a power-producing medium to said wheel, as set forth.

5. The combination with the spindle and a motor-case, of a bucketed wheel on the spindle within the case, means for supplying a power-producing medium to said wheel, and a superposed bowl, bowl-casing and interposed air-chamber, substantially as specified.

6. As a means for varying the density of the cream discharged from a centrifugal separator bowl, a delivery tube mounted for rotation within the bowl to receive the cream at points varying in distance from the center of the bowl, as set forth.

7. As a means for varying the density of the cream discharged from a centrifugal separator bowl, a delivery tube within the bowl adapted to be rotated and having a portion at one end at an angle to the tube as and for the purpose specified.

8. A separator bowl provided with a substantially vertical delivery tube located to enter the cream wall and having a nozzle at one end capable of rotary movement, as and for the purpose specified.

9. A separator bowl provided with a vertically disposed delivery tube having a nozzle adjustable to vary the density of the cream delivered from the tube, as set forth.

10. The combination with the bowl of a centrifugal machine, of a tube projected within the bowl and in the cream space thereof and terminating in a curved rotatable end portion, substantially as specified.

11. The combination with a bowl of a centrifugal machine, of a cream discharge tube projected into the interior of the bowl and terminating at its outer end with a rotatable bent tube, substantially as specified.

In testimony whereof I affix my signature in presence of two witnesses.

NATHAN G. WILLIAMS.

Witnesses:
FRANK G. DAY,
E. H. BOND.